United States Patent [19]
Martin

[11] Patent Number: 5,118,258
[45] Date of Patent: Jun. 2, 1992

[54] DUAL PUMP FUEL DELIVERY SYSTEM

[75] Inventor: Anthony N. Martin, Simsbury, Conn.

[73] Assignee: United Technologies Corporation, Hartford, Conn.

[21] Appl. No.: 577,230

[22] Filed: Sep. 4, 1990

[51] Int. Cl.⁵ .............................................. F04B 49/06
[52] U.S. Cl. ........................................ 417/3; 417/426; 60/734
[58] Field of Search ....................... 417/3, 4, 5, 6, 426; 60/734, 39.281

[56] References Cited
U.S. PATENT DOCUMENTS

| | | | |
|---|---|---|---|
| 2,946,190 | 7/1960 | Corbett | 60/39.281 |
| 2,989,842 | 6/1961 | Wood et al. | 60/243 |
| 3,382,672 | 5/1968 | French | 60/243 |
| 3,696,612 | 10/1972 | Berman | 60/39.281 |
| 3,946,551 | 3/1976 | Linebrink et al. | 60/39.28 R |
| 4,185,460 | 1/1980 | Moore et al. | 60/39.281 |
| 4,208,871 | 1/1980 | Riple, Jr. | 60/39.281 |
| 4,607,486 | 8/1986 | Cole | 60/734 |
| 4,864,159 | 9/1989 | Cygnor | 60/39.141 |
| 4,899,535 | 2/1990 | Dehan et al. | 60/39.08 |
| 4,987,737 | 1/1991 | Cantwell | 60/39.281 |

Primary Examiner—Richard A. Bertsch
Assistant Examiner—David W. Scheuermann
Attorney, Agent, or Firm—Patrick J. O'Shea

[57] ABSTRACT

A dual pump fault tolerant fuel delivery system for providing a metered fuel flow to an aircraft gas turbine engine, combines a fixed displacement pump with a demand control pump operating at a speed commanded by an electronic engine control such that the electronic engine control can provide the metered fuel flow by controlling the speed of the demand control pump and the area of a metering valve to reduce the temperature of the fuel in comparison to fuel systems employing a fixed displacement pump, a pressure regulating valve and a bypass fuel flow system.

8 Claims, 3 Drawing Sheets

FIG. 3

| ENGINE SPEED .GT. GROUND IDLE | FDP FAULT | DCP OPERATIONAL | BYPASS SOLENOID VALVE |
|---|---|---|---|
| 0 | 0 | 0 | CLOSED |
| 0 | 0 | 1 | CLOSED |
| 0 | 1 | 0 | CLOSED |
| 0 | 1 | 1 | OPEN |
| 1 | 0 | 0 | CLOSED |
| 1 | 0 | 1 | OPEN |
| 1 | 1 | 0 | CLOSED |
| 1 | 1 | 1 | OPEN |

DUAL PUMP FUEL DELIVERY SYSTEM

DESCRIPTION

1. Technical Field

This invention relates to fuel delivery systems and more particularly to fuel delivery systems for aircraft gas turbine engines.

2. Background Art

It is well known in the art of fuel delivery systems for aircraft gas turbine engines to use a single fixed displacement pump such as a vane or gear pump to pressurize fuel prior to its metering and subsequent delivery to the engine. Fixed displacement pumps provide a flow whose volume is a function of the speed at which the pump is rotating. This characteristic makes it impossible to provide a metered fuel flow to the engine solely by controlling the area of a metering valve when the pump is driven from the engine. Therefore a pressure regulating valve (PRV) and a fuel flow bypass system are used to facilitate the delivery of an accurately measured fuel flow to the engine.

Fixed displacement pump size is selected to ensure an excess flow capacity is provided under all possible engine operating conditions. The pressurized fuel is then typically input to the PRV which operates to provide a fixed pressure drop across a metering valve controlled by an electronic engine control (EEC). Operation of the PRV and the metering valve together is based upon incompressible flow theory which states that flow through a valve is a function of the valve area multiplied by the square root of the pressure drop across the valve. Thus with the PRV providing a fixed pressure drop across the metering valve the EEC can control the area of the metering valve to provide the required fuel flow to the engine.

To maintain the fixed pressure drop across the metering valve the PRV uses a fuel bypass system to bypass fuel from the outlet of the pump back to the inlet of the pump.

However, thermal management problems arise with this arrangement when the pump outlet flow is much higher than the engine required fuel flow and a large quantity of excess fuel is continuously being bypassed back to the inlet of the pump. Since work is required to pump fuel from low to high pressure significant fuel heat rise can result. The magnitude of this problem is enhanced since a small engine fuel flow requirement in comparison to the amount of fuel flow being provided by the fixed displacement pump means that enough cooler fuel is not being brought in from the aircraft fuel tanks to overcome the heat rise of the bypass flow. As an example a commercial 150 seat aircraft such as the Boeing 757 with two Pratt & Whitney PW2037 engines each rated at 38,250 lbs. thrust consumes approximately 5,000 pph of fuel while the fixed displacement pump flow is approximately 16,000 pph resulting in 11,000 pph bypass flow while operating at cruise power. Thus, a thermal management problem for the whole engine results since fuel is normally used as a heat sink for the engine/oil heat exchanger which relies on heat transfer from the hot bearing lubricating oil to the cooler fuel. The thermal management problem is becoming particularly acute with the advent of new generation aircraft and their associated engines, such as aircraft powered by unducted or propfan gas turbine engines. These aircraft employ fuel efficient engines and may be capable of cruising at high altitudes for twelve hours or longer without refueling.

In the case of the propfan engine, the gearbox coupling the turbine to the propfan blades transmits a great deal more power than even what the largest current generation turboprop engine is producing. The result is increased heat being generated by the propfan gearbox and thus an increase in the temperature of the lubricating oil used to remove the heat from the gearbox. This causes a temperature increase of the fuel delivered to the engine since the fuel is used to remove heat from the lubricating oil. U.S. Pat. 4,773,212 assigned to the assignee of the present invention illustrates a system for maintaining a thermal balance between the engine and the engine accessories, such as the fuel system, and lubricating oil system.

A second problem also arises in the new generation aircraft such as large commercial twin engine aircraft capable of extended over water operations. These operations, referred to as Extended Twin Operations (ETOPS), have recently been approved to allow specially certified twin engine aircraft to operate on over water flights up to 180 minutes single engine flying time from a suitable airport. Obviously these operations would not be approved without the proven reliability of the specially certified aircraft/engine types. Regardless of reliability numbers, a critical failure of the fuel pump for one of the two engines would force the engine associated with the failed fuel pump to be shutdown since the fuel control could no longer control fuel flow.

DISCLOSURE OF THE INVENTION

An object of the present invention is to reduce the thermal management problem discussed hereinbefore by utilizing a demand control pump to provide only the maximum potential requirement for engine fuel flow at the particular aircraft engine operating point. The requirement would typically correspond to the fuel flow associated with the acceleration limit set by the EEC for the particular engine operating point.

Another object of the present invention is to decrease the engine inflight shutdown rate due to the loss of a fuel pump which is especially critical for ETOPS.

According to the present invention, a dual pump fuel delivery system for providing a metered fuel flow to an engine, comprises a first fuel delivery system used primarily for engine starting having a fixed displacement pump driven by an engine which provides a fuel flow whose pressure is regulated by a pressure regulating valve that bypasses a portion of the fixed displacement pump fuel output to the fixed displacement pump input to maintain a constant pressure drop across a metering valve, allowing an electronic engine control to schedule a metered fuel flow by controlling the metering valve area, and comprises a second fuel delivery system having a demand control pump operating at a speed commanded by the electronic engine control for providing a pressurized fuel flow to the metering valve such that the electronic engine control can adjust the metered fuel flow by controlling the speed of the demand control pump and the metering valve area, the system further comprises a valve responsive to a command from the electronic engine control for controlling whether the first fuel delivery system or the second fuel delivery system provides the metered fuel flow.

The present invention has the utility of using a demand control pump to provide a metered fuel flow to an aircraft gas turbine engine at a reduced temperature in comparison to a system which uses a fixed displacement pump and a PRV to provide the metered fuel flow. The present invention also has the utility of improving the inflight shutdown rate of an engine due to a fuel pump failure since the invention comprises a two pump architecture tolerant of the failure of either one of the two pumps.

These and other objects, features and advantages of the present invention will become more apparent in light of the following detailed description of a best mode embodiment thereof as illustrated in the accompanying drawing.

BRIEF DESCRIPTION OF THE DRAWING

FIG. 3 is truth table for the solenoid command from the control logic of FIG. 2 to the bypass solenoid valve of FIG. 1.

BEST MODE FOR CARRYING OUT THE INVENTION

Figure 1:
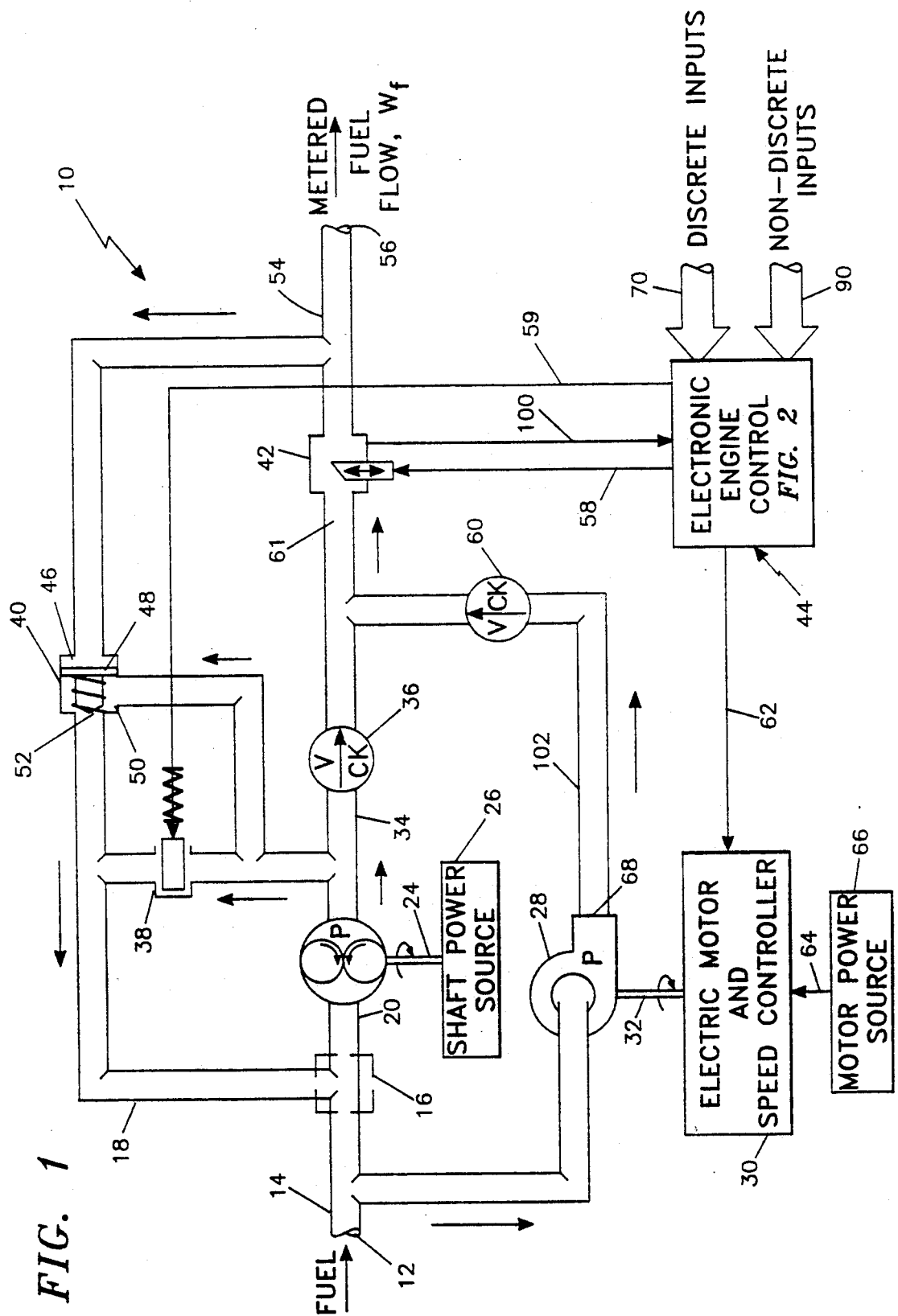
FIG. 1 illustrates the dual pump improved fuel delivery system in accordance with the present invention.

In FIG. 1 is illustrated a functional block diagram of a dual pump improved fuel delivery system 10 (hereinafter referred to as "the system") in accordance with the present invention. Fuel enters the system 10 at an inlet port 12 and flows through an inlet line 14 and into a coupler 16. Within the coupler 16 the fuel from the inlet line 14 mixes with fuel from a bypass line 18 and exits the coupler into a pump inlet line 20. Fuel in the pump inlet line 20 enters a fixed displacement pump (FDP) 22, illustrated as a gear type of displacement pump driven by a rotating shaft 24 from a shaft power source 26 (e.g., an engine). Fuel in the inlet lie 14 is also delivered by an electric motor and speed controller 30 via a coupling shaft 32. The system 10 uses the DCP 28 and the FDP 22 to operate in two modes, the DCP mode and the FDP mode.

The FDP provides a pressurized fuel flow whose volume is a function of the rotating shaft 24 speed. Fuel flow from the FDP enters a pump outlet line 34 connected to a first check valve 36, a bypass solenoid valve 38 and a pressure regulating valve 40 (PRV). During operation in the FDP mode the PRV maintains a fixed pressure drop across a metering valve 42. Operation of the PRV and the metering valve together is based upon incompressible flow theory which states that flow through a valve is a function of the valve area multiplied by the square root of the pressure drop across the valve. Hence with the PRV 40 providing a fixed pressure drop across the metering valve 42, an electronic engine control 44 (EEC) can control the area of the metering valve to provide the required fuel flow to the engine (not shown) The system operates in the FDP mode when the FDP 22 is providing flow to the metering valve.

To operate in the FDP mode the EEC 44 commands the bypass solenoid valve 38 closed blocking flow through the valve and commands the DCP 28 off or to operate at a low enough speed to ensure flow through the first check valve 36. When the bypass solenoid valve is closed, the PRV maintains the pressure drop of the fuel across the metering valve constant by bypassing fuel in the pump outlet line 34 to the bypass line 18.

In the interest of clarity the PRV 40 is illustrated in FIG. 1 by a simple functional illustration. If the pressure of the fuel in a first volume 46 acting on a piston 48 is greater than the sum of the force created by the pressure in a second volume 50 and the force of a spring 52 acting on the piston, the piston moves to the left. This decreases the bypass flow from the pump outlet line 34 to the bypass line 18 and into the coupler 16 while the system operates in the FDP mode. Otherwise if the force exerted on the piston by the pressure in the first volume 46 is less then the sum of the force being exerted by the spring and the force exerted on the piston by the pressure in the second volume 50, the piston moves to the right increasing the bypass flow.

The PRV maintains the pressure drop across the metering valve constant to facilitate EEC control of a metered fuel flow, $W_f$, which flows in a metering valve outlet line 54 and exits the system at a outlet port 56. The EEC performs this by controlling a signal on a line 58 which commands the desired metering valve area.

However, using a PRV with a FDP has a disadvantage that at normal engine cruise speeds and altitudes the PRV is bypassing a large percentage of the fuel being pressurized by the FDP. Hence, the FDP is working to pressurize significantly more fuel than is currently required to satisfy the metered fuel flow $W_f$, only for the bypassed portion of the pressurized fuel to lose pressure while flowing back through the PRV and the bypass line.

In addition to the work the FDP performs to pressurize the fuel it contains inefficiencies which increase the temperature of the fuel. Therefore when a significant amount of fuel is being bypassed, several trips through the FDP may occur resulting in a temperature increase each trip before ultimately flowing into the fuel metering valve. Heating the fuel creates a thermal penalty within the system since the temperature increase of the metered fuel flow $W_f$ decreases the downstream ability of $W_f$ to operate as a heat sink for hot engine oils prior to combustion within the engine. In addition the increased temperature of the fuel may cause coking at the fuel nozzles (not shown) of the system.

By using the DCP 28, e.g., a centrifugal pump, the EEC can directly control the pressure of the fuel being delivered to the metering valve without having to bypass fuel and incur the thermal penalty. When the EEC wants the DCP to provide fuel to the metering valve (i.e., operate in the DCP mode) the EEC commands the bypass solenoid valve 38 open via a solenoid command on a line 59. Opening the bypass solenoid valve shunts the fuel exiting the FDP through the bypass solenoid valve into the bypass line 18 and subsequently into the FDP again. The outlet pressure of the fuel exiting the FDP in the pump outlet line 34 is approximately equal to the pressure in the pump inlet line 20. This allows the DCP 28 to provide a flow through a second check valve 60 into a delivery line 61 and then into the metering valve 42 when the flow has sufficient pressure to close the first check valve 36 against the pressure in the pump outlet line 34.

To control the DCP the EEC sends a speed signal on a line 62 to command the electric motor and speed controller 30 that drives the DCP at a desired speed. Power for the electric motor and speed controller is received on a line 64 from a motor power source 66, e.g., a generator. Since the DCP provides a fuel flow whose pressure is proportional to the speed of the coupling shaft 32, by commanding the electric motor and speed controller to a desired speed a desired pressure is provided at a DCP outlet 68. The EEC takes advantage of this feature to control the metered fuel flow $W_f$ at the outlet port 56 by controlling both the DCP speed and the metering valve area.

Figure 2:
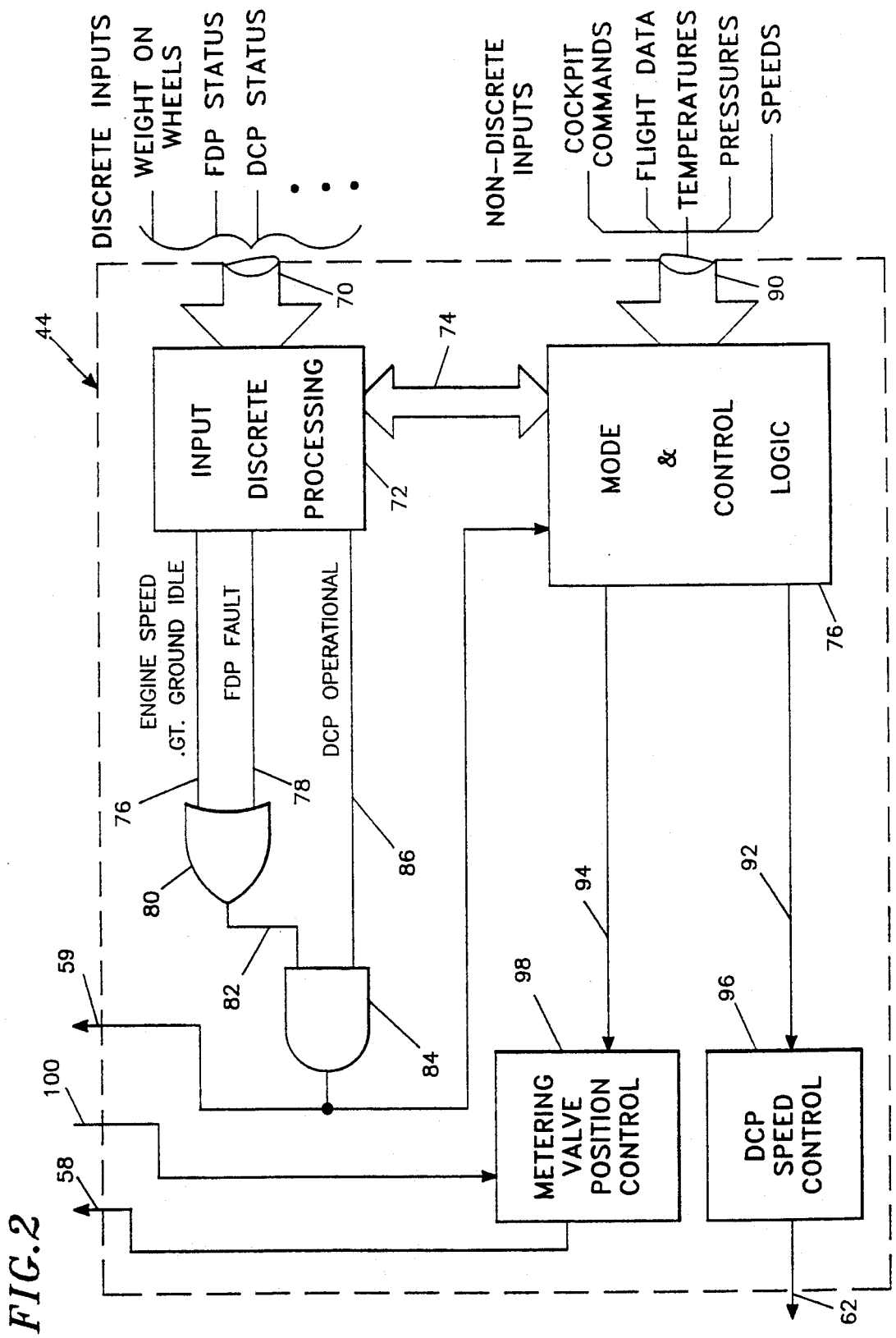
FIG. 2 illustrates the control logic for the operation of the dual pump improved fuel delivery system of FIG. 1.

The system is best understood by an example of how the two pumps work during the DCP mode and the FDP mode. FIG. 2 illustrates logic within the EEC to control the bypass solenoid valve 38, the DCP 28 and the metering valve 42.

One or more discretes from various locations within the aircraft and engine are input to the EEC 44 via a bus 70. Within the EEC the discretes are processed by input discrete processing logic 72 which shares data over a bus 74 with mode & control logic 76 to be discussed hereinafter. The input discrete processing logic 72 generates three discretes: Engine Speed .GT. Ground Idle, FDP Fault, and DCP Operational. The Engine Speed GT. Ground Idle discrete on a line 76 is set (i.e., "1") only when the engine speed is greater than or equal to the ground idle speed of the engine. The FDP Fault discrete on a line 78 is set only when the FDP 22 is no longer capable of proper operation due to a failure in the system If either the Engine Speed GT. Ground Idle discrete or the FDP Fault discrete is set, the output of an OR gate 80 on a line 82 is set. Otherwise the output of the OR gate is cleared (i.e., "0"). The output of the OR gate is input to a two input AND gate 84 along with the DCP Operational discrete on a line 86. The DCP Operational discrete is set when the DCP 28 is operating without any detected anomalies which may prevent the EEC 44 from properly controlling the DCP. If the signals on the lines 82,86 are both set then the output of the AND gate on the line 59 is set driving the bypass solenoid valve 38 open. Otherwise the signal on the line 59 is cleared closing the solenoid bypass valve. FIG. 3 illustrates the state of the bypass solenoid valve for all the possible combinations of the Engine Speed .GT. Ground Idle, FDP Fault, and DCP Operational discretes.

Top-level logic for controlling the electric motor and speed controller, and the metering valve area are also illustrated in FIG. 2. A plurality of signals such as cockpit commands, speeds, pressures, temperatures and flight data are input to the mode & control logic on a bus 90. Information from the input discrete processing logic 72 is also input to the mode & control logic 76 on the bus 74. The requirements for control logic within the EEC are known to comprise limiting loops such as acceleration and deceleration limits, as well as power limit loops and rating logic with outer loops on engine pressure ratio (EPR) or exhaust gas temperature (EGT) and typically an inner loop on gas generator speed. Examples of control logic for a gas turbine engine are illustrated in U.S. Pat. Nos. 3,902,315 and 4,296,601 assigned to the assignee of the present invention and hereby incorporated by reference.

The mode & control logic calculates the required fuel flow based upon inputs received, and outputs the required fuel flow demand on lines 92,94. This demand may take the form of an increase or decrease of fuel flow to satisfy the demand of the closed loop logic to null loop error, rather than commanding a specific fuel flow. DCP speed control logic 96 schedules a DCP motor speed based on the required fuel flow demand on the line 92 and outputs a speed command on the line 62 to the electric motor and speed controller. Metering valve command logic 98 calculates a required metering valve area based upon the required fuel flow demand on a line 94 and the metering valve position on a line 100. A metering valve area command indicative of the required metering valve area is output on the line 58.

Operation of the system may be further understood by an example which demonstrates operation during an engine start and normal engine operation. If the DCP Operational discrete is set and the FDP Fault is cleared, then during an engine start the bypass solenoid valve 38 is closed until the Engine Speed .GT. Ground Idle discrete is set. Hence the system operates in the FDP mode until the Engine Speed .GT. Ground Idle discrete is set, which initiates the DCP mode if the DCP Operational discrete remains set.

When the bypass solenoid valve opens to initiate the DCP mode, both the DCP speed control logic 96 and the metering valve control logic 98 begin to control the metered fuel flow $W_f$. During this mode fuel enters the inlet line 14 and flows into and through the DCP 28, to a DCP outlet line 102 through the second check valve 60 and into the metering valve 42. Hence, $W_f$ no longer comprises fuel which has been bypassed around the FDP 22.

Along with the advantage of reducing the thermal management problem incurred due to the hereinbefore discussed excessive bypass flow while operating in the FDP mode the system is also tolerant of several failures. When the DCP Operational discrete on the line 86 is cleared during the DCP mode, the bypass solenoid valve command on the line 59 is cleared commanding the bypass solenoid valve to the closed position. This terminates shunting the bypass flow through the bypass solenoid valve and re-initiates control of the bypass flow by the PRV, transferring the system operation from the DCP mode to the FDP mode. The bypass solenoid valve command is also input to the mode & control logic to initiate a lower fuel flow request on the line 92, and thus a lower speed command on the line 62 when the bypass solenoid valve command is cleared. During this fault accommodation situation pressurized fuel entering the metering valve 42 is provided from the FDP 22 through the first check valve 36. Thus if the system is installed within an ETOPS certified aircraft, when a critical failure occurs in the DCP during the DCP mode the FDP is available as a backup. In addition the architecture of this system allows the verification of the FDP each engine start.

Conversely if a failure is detected during the FDP mode, the FDP Fault discrete on the line 78 is set which sets the bypass solenoid valve command on the line 59 when the DCP Operational discrete is set, initiating the DCP mode. The bypass solenoid valve opens and the electric motor is brought up to a speed necessary to provide sufficiently pressurized fuel to the metering valve.

It should be understood that the scope of this invention is not limited to systems which employ a bypass solenoid valve in parallel with the PRV. As an example instead of using a bypass solenoid valve, the first check valve and the second check valve in the system could be electrically controlled by the EEC to control whether flow from the FDP or the DCP enters the fuel metering valve. As a further example a multiplexing valve under the control of the EEC could be used immediately upstream of the fuel metering valve to receive and route flow from the DCP or FDP into the fuel metering valve. Pressurized fuel from the system may also be used to supply the muscle for the engine servo actuators by tapping into the delivery line 61 immediately upstream of the metering valve and making the necessary adjustments to the control laws within the EEC.

All the foregoing changes and variations are irrelevant to the invention, it suffices that a dual mode improved fuel delivery system comprises a first fuel delivery system normally used for engine starting having a fixed displacement pump driven by an engine which provides a fuel flow whose pressure is regulated by a pressure regulating valve that bypasses a portion of the fixed displacement pump fuel output to the fixed displacement pump input to maintain a constant pressure drop across a metering valve, allowing an electronic engine control to schedule a metered fuel flow by controlling the metering valve area, and comprises a second fuel delivery system having a demand control pump operating at a speed commanded by the electronic engine control for generating a pressurized fuel flow to the metering valve such that the electronic engine control can adjust the metered fuel flow by controlling the speed of the demand control pump and the metering valve area, the system further comprises a valve responsive to a command from the electronic engine control for controlling whether the first fuel delivery system or the second fuel delivery system provides the metered fuel flow.

Although the present invention has been shown and described with respect to a best mode embodiment thereof, it should be understood by those skilled in the art that various other changes, omissions and additions to the form and detail thereof, may be made therein without departing from the spirit and scope of the invention.

I claim:

1. A dual pump improved fuel delivery system providing a metered fuel flow to an aircraft gas turbine engine under the control of an electronic engine control, comprising:
   an inlet line, for supplying a low pressure fuel;
   a fixed displacement pump, operating at a speed proportional to the speed of the aircraft gas turbine engine, for pressurizing an inlet fuel flow comprising said low pressure fuel, and for providing a pressurized output fuel flow in a pump outlet line;
   an electric motor, responsive to a command speed signal from the electronic engine control, said motor operates at a variable speed indicative of said command speed signal;
   a demand control pump means, drivenly connected to said electric motor, parallel to said fixed displacement pump, for operating at a speed indicative of the speed of said electric motor to pressurized said low pressure fuel;
   a fuel delivery line, disposed to receive fuel flow from two or more sources including said fixed displacement pump and said demand control pump means;
   first check valve means, disposed between said fuel delivery line and said demand control pump means, for preventing fuel flow from said fixed displacement pump from entering the outlet of said demand control pump means;
   second check valve means, disposed between said fuel delivery line and said fixed displacement pump, for preventing fuel flow from said demand control pump means from entering the outlet of said fixed displacement pump;
   means, responsive to the electronic engine control, for controlling whether said pressurized output fuel flow or fuel flow from said demand control pump means flows into said fuel delivery line;
   a fuel metering valve, for metering fuel from said fuel delivery line with a variable metering valve area controlled by the electronic engine control in order to provide a metered fuel flow into a metering valve outlet line; and
   a pressure regulating valve, for bypassing a portion of said pressurized output fuel flow within said pump outlet line to a bypass line coupled to said inlet line in order to maintain a fixed pressure drop across said fuel metering valve while said pressurized output fuel flow is entering said fuel metering valve.

2. The system of claim 1, wherein said means for controlling further comprises:
   mode control means for selecting said pressurized output fuel flow to flow into said fuel delivery line while engine speed is less than or equal to a ground idle set point, and for selecting fuel flow from said demand control pump means into said fuel delivery line when engine speed is greater than said ground idle set point.

3. The system of claim 1, wherein said demand control pump means comprises a centrifugal pump.

4. A dual pump improved fuel delivery system providing a metered fuel flow to an aircraft gas turbine engine under the control of an electronic engine control, comprising:
   an inlet line, for supplying a low pressure fuel;
   a fixed displacement pump, operating at a speed proportional to the speed of the aircraft gas turbine engine, for pressurizing an inlet fuel flow comprising said low pressure fuel, and for providing a pressurized output fuel flow in a pump outlet line;
   an electric motor, which operates at a variable speed in response to a command speed signal from the electronic engine control;
   a demand control pump means, parallel to said fixed displacement pump and driven by said electric motor to operate at a variable speed proportional to the speed of said electric motor, for pressurizing said low pressure fuel to a pressure indicative of the speed of said electric motor;
   a fuel delivery line, disposed to receive fuel flow from two or more sources including said fixed displacement pump and said demand control pump means;
   a fuel metering valve, for metering fuel from said fuel delivery line with a variable metering valve area controlled by the electronic engine control in order to provide a metered fuel flow into a metering valve outlet line;
   a pressure regulating valve, for bypassing a portion of said pressurized output fuel flow within said pump outlet line to a bypass line coupled to said inlet line in order to maintain a fixed pressure drop across said fuel metering valve when said pressurized output fuel flow enters said fuel metering valve; and
   valve means, responsive to the electronic engine control and parallel to said pressure regulating valve, for shunting fuel flow from said pump outlet line to said bypass line in order to control whether fuel flow from said fixed displacement pump or fuel flow from said demand control pump means flows into said fuel delivery line.

5. The system of claim 4, further comprising:

first check valve means, disposed between said fuel delivery line and said demand control pump means, for preventing fuel flow from said fixed displacement pump from entering the outlet of said demand control pump means; and second check valve means, disposed in said pump outlet line, for preventing fuel flow from said demand control pump means from entering the outlet of said fixed displacement pump.

6. A dual mode improved fuel delivery system providing a metered fuel flow to an aircraft gas turbine engine under the control of an electronic engine control, comprising:

means for supplying a low pressure fuel;

a fixed displacement pump, operating at a speed proportional to the speed of the aircraft gas turbine engine, for pressurizing an inlet fuel flow comprising said low pressure fuel, and for providing a pressurized output fuel flow in a pump outlet line;

an electric motor, responsive to a command speed signal from the electronic engine control, said motor operates at a variable speed indicative of the value of said command speed signal;

demand control pump means, drivenly connected to said electric motor, operating parallel to said fixed displacement pump and at a speed indicative of the speed of said electric motor, for pressurizing said low pressure fuel;

valve means, responsive to the electronic engine control, for routing the fuel flow from either said fixed displacement pump or said demand control pump means into a delivery line, for routing fuel flow from the fixed displacement pump to said delivery line when the engine is being started, and for routing fuel flow from the demand control pump means to said delivery line in other engine operating modes;

a fuel metering valve, disposed to receive fuel from said delivery line, having a variable metering valve area controlled by the electronic engine control in order to provide a metered fuel flow into a metering valve outlet line; and a pressure regulating valve, for maintaining a fixed pressure drop across said fuel metering valve by bypassing a variable amount of a pressurized fuel from the outlet of said fixed displacement pump to the inlet of said fixed displacement pump when said valve means routes fuel flow from said fixed displacement pump to said delivery line, where said pressurized fuel is mixed with said low pressure fuel to create said inlet fuel flow.

7. The system of claim 6, wherein:

said pump outlet line comprises a first branch line and a second branch line, wherein said first branch line provides fuel flow to said valve means and said pressure regulating valve, and a second branch line provides fuel flow to said fuel delivery line;

8. The system of claim 9, further comprising:

first check valve means, disposed between said fuel delivery line and said demand control pump means, for preventing fuel flow from said demand control pump means from entering the outlet of said fixed displacement pump; and second check valve means, disposed in said second branch line for preventing fuel flow from said fixed displacement pump from entering the outlet of said demand control pump means.

* * * * *